(12) United States Patent
Nelson et al.

(10) Patent No.: US 10,779,544 B2
(45) Date of Patent: Sep. 22, 2020

(54) RACK OVEN AND SYSTEMS FOR USING THE SAME

(71) Applicant: Belshaw Bros., Inc., Auburn, WA (US)

(72) Inventors: Joe Nelson, Auburn, WA (US); Jay Hillebrandt, Auburn, WA (US); Chris Brock, Auburn, WA (US); Michael J. Ploof, Auburn, WA (US); William Setter, Auburn, WA (US)

(73) Assignee: Belshaw Bros., Inc., Auburn, WA (US)

( * ) Notice: Subject to any disclaimer, the term of this patent is extended or adjusted under 35 U.S.C. 154(b) by 177 days.

(21) Appl. No.: 15/906,923

(22) Filed: Feb. 27, 2018

(65) Prior Publication Data

US 2018/0249718 A1 Sep. 6, 2018

Related U.S. Application Data

(60) Provisional application No. 62/465,637, filed on Mar. 1, 2017.

(51) Int. Cl.
*A21B 1/26* (2006.01)
*F23L 13/00* (2006.01)
(Continued)

(52) U.S. Cl.
CPC ............. *A21B 1/26* (2013.01); *A21B 1/24* (2013.01); *A21B 1/28* (2013.01); *F23J 11/02* (2013.01); *F23L 13/00* (2013.01)

(58) Field of Classification Search
CPC ............. A21B 1/26; A21B 1/28; F23J 11/02
(Continued)

(56) References Cited

U.S. PATENT DOCUMENTS

| 4,322,204 A | 3/1982 | Voegtlin et al. |
| 4,782,214 A * | 11/1988 | Voegtlin .......... A21B 1/24 126/21 A |

(Continued)

FOREIGN PATENT DOCUMENTS

| EP | 0071004 A1 | 2/1983 |
| EP | 0449094 A1 | 10/1991 |

OTHER PUBLICATIONS

International Search Report and Written Opinion for PCT/US2018/019985, dated May 17, 2018, 11 pages.
(Continued)

*Primary Examiner* — Avinash A Savani
(74) *Attorney, Agent, or Firm* — Seed Intellectual Property Law Group LLP

(57) ABSTRACT

A cooking or baking oven can include a hood having a vent outlet and a cooking chamber having a rack positioned therein. The cooking or baking oven can also include a heating chamber separated from the cooking chamber, a fuel burner, a fuel burner blower operably coupled to the fuel burner, a burner tube having an inlet end and an outlet end, the inlet end coupled to the fuel burner, and a flue having an inlet end coupled to the outlet end of the burner tube and an outlet end coupled to the hood, the flue having an opening. The cooking or baking oven can also include a damping system having a damper lid coupled to the flue, the damper lid moveable between an open position and a closed position, the damper lid in the closed position covering the opening; a damper motor; and a damper arm coupled to the damper lid and the damper motor, the damper motor rotatably moving the damper arm to move the damper lid between the open and closed positions. Related systems and methods are also provided.

19 Claims, 7 Drawing Sheets

(51) Int. Cl.
  *F23J 11/02* (2006.01)
  *A21B 1/28* (2006.01)
  *A21B 1/24* (2006.01)
(58) Field of Classification Search
  USPC ..................................................... 126/21 A
  See application file for complete search history.

(56) References Cited

U.S. PATENT DOCUMENTS

| | | | | |
|---|---|---|---|---|
| 4,839,486 | A * | 6/1989 | Tanigawa | H05B 6/642 |
| | | | | 219/681 |
| 5,166,487 | A * | 11/1992 | Hurley | F24C 15/322 |
| | | | | 122/4 R |
| 9,204,661 | B2 | 12/2015 | Ploof et al. | |
| 9,372,000 | B2 | 6/2016 | Ploof et al. | |
| 2006/0191924 | A1 * | 8/2006 | Raus | F24C 15/2014 |
| | | | | 219/757 |
| 2014/0099589 | A1 * | 4/2014 | Ploof | F24B 5/028 |
| | | | | 432/21 |

OTHER PUBLICATIONS

International Preliminary Report on Patentability for PCT/US2018/019985, dated Sep. 12, 2019, 8 pages.

* cited by examiner

RACK OVEN AND SYSTEMS FOR USING THE SAME

BACKGROUND

Technical Field

The present disclosure is generally related to ovens and, more particularly, to commercial cooking rack ovens.

Description of the Related Art

Commercial cooking rack ovens generally include a baking chamber that receives a rack having a plurality of shelves. Food products that have to be baked, roasted, or generally cooked are placed on the shelves, which can be rotatable via various drive mechanisms. The food items in the cooking chamber are generally cooked through combustion systems of cooking rack ovens, which include one or more fuel-fed burners. The heat generated from the burning of combustion gases is circulated to the cooking chamber, for example, in the form of hot air flowing along a heated air flow path. Typically, such commercial rack ovens include a heat exchanger having a plurality of heat exchange tubes and a corresponding number of fuel-fed burners directly coupled thereto. Air blowers generally circulate air past the heat exchange tubes and to the cooking chamber. Such commercial cooking ovens, however, are expensive to manufacture, complex, and result in inefficiencies, for example, via loss of efficiencies during the heat exchange process between the combustion gases and the cooking air.

Efforts to reduce the loss of efficiencies discussed above have typically involved using direct fire ovens, which can omit or exclude heat exchangers. Such direct fire ovens generally force air directly through the flame to heat the cooking air. However, purging of potential unburned combustion gases prior to ignition has been problematic in direct fire ovens, and also in indirect fire ovens. In particular, purging of potential unburned combustion gases typically involves purging large volumes integrated with the cooking chamber volume. In addition to requiring purging of large volumes of potential unburned combustion gases, both direct fire systems and indirect fire system increase inefficiencies due to temperature fluctuations inside the cooking oven. Efforts to maintain temperatures within certain limits have typically involved fluctuating or switching the combustion burners between their on and off positions to maintain the temperatures. However, such techniques result in inefficiencies, time delays, and temperature spikes.

BRIEF SUMMARY

In various implementations, cooking or baking ovens and related systems with robust and efficient form factors enable purging of reduced volumes of potential unburned combustion gases. Further, in various implementations, cooking or baking ovens and related systems improve efficiencies and mitigate temperature spikes and time delays. In one example, non-limiting implementation, a cooking or baking oven can be summarized as including a hood having a vent outlet, a cooking chamber, a rack positioned in the cooking chamber, and a heating chamber separated from the cooking chamber. The cooking or baking oven can include a fuel burner, a fuel burner blower operably coupled to the fuel burner, a burner tube having an inlet end and an outlet end, the inlet end coupled to the fuel burner, a flue having an inlet end coupled to the outlet end of the burner tube and an outlet end coupled to the hood, the flue having an opening, and a damping system. The damping system can include a damper lid coupled to the flue, a damper motor, and a damper arm coupled to the damper lid and the damper motor. The damper lid can be moveable between an open position and a closed position, where the damper lid in the closed position can cover the opening. The damper motor can rotatably move the damper arm to move the damper lid between the open and closed positions.

In one example, non-limiting implementation, a cooking management system can be summarized as including a cooking or baking oven which includes a heating chamber and a heating chamber having a heating chamber volume. The cooking or baking oven can include a fuel burner which provides combustion gases, a fuel burner blower operably coupled to the fuel burner, a hood having a vent outlet, the hood coupled to the fuel burner via an enclosure which defines an interior volume of combustion gases, and a damping system. The damping system can include a damper lid coupled to the enclosure, a damper arm coupled to the damper lid, a damper motor operably coupled to the damper lid, the damper motor moving the damper lid between an open position and a closed position. The cooking management system can further include a controller operably coupled to the damper motor, where the controller can cause the damper motor to move the damper lid between the open and closed positions.

DETAILED DESCRIPTION

Figure 1:
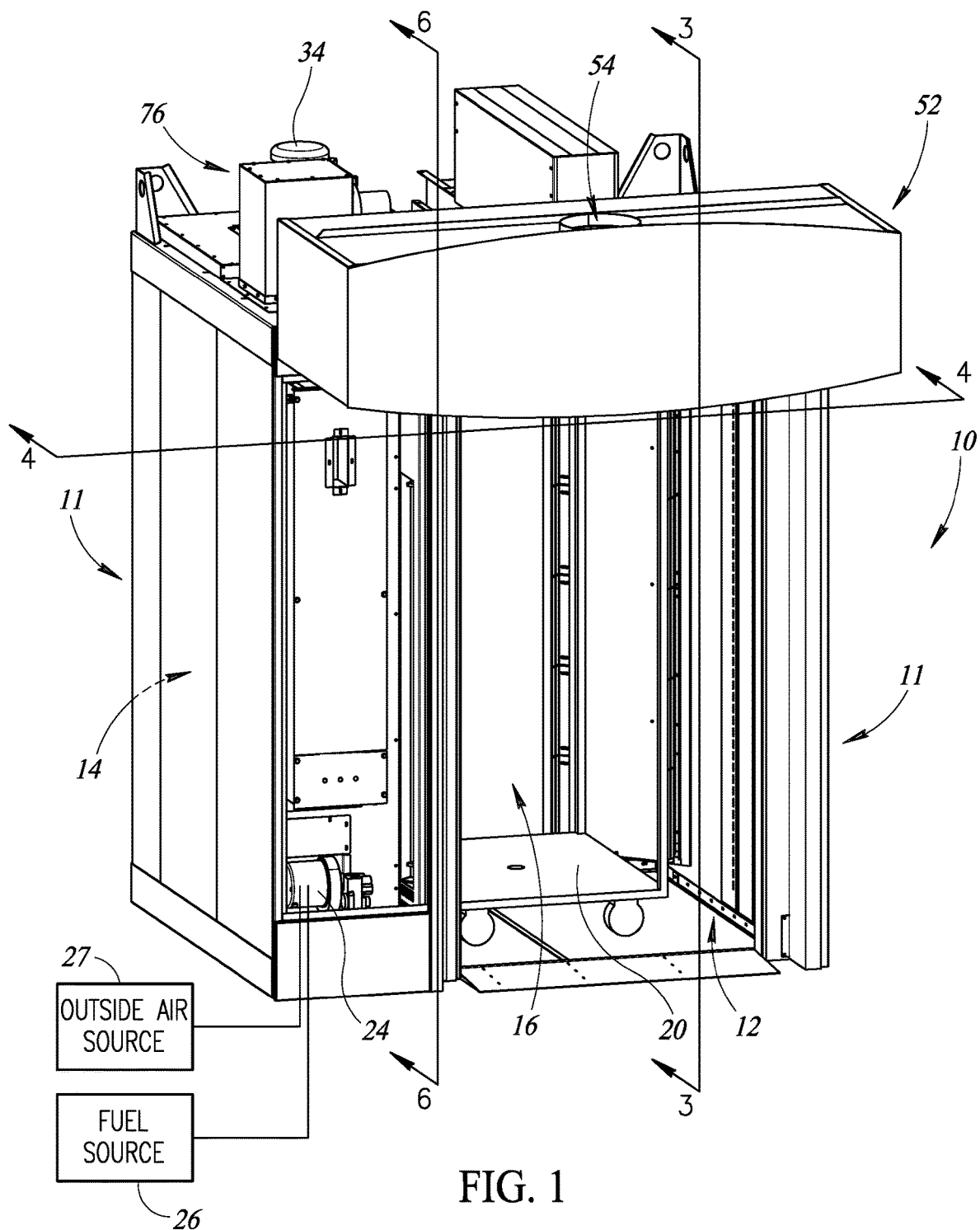
FIG. 1 is a perspective view of a cooking or baking oven, according to one example implementation.
Figure 2:
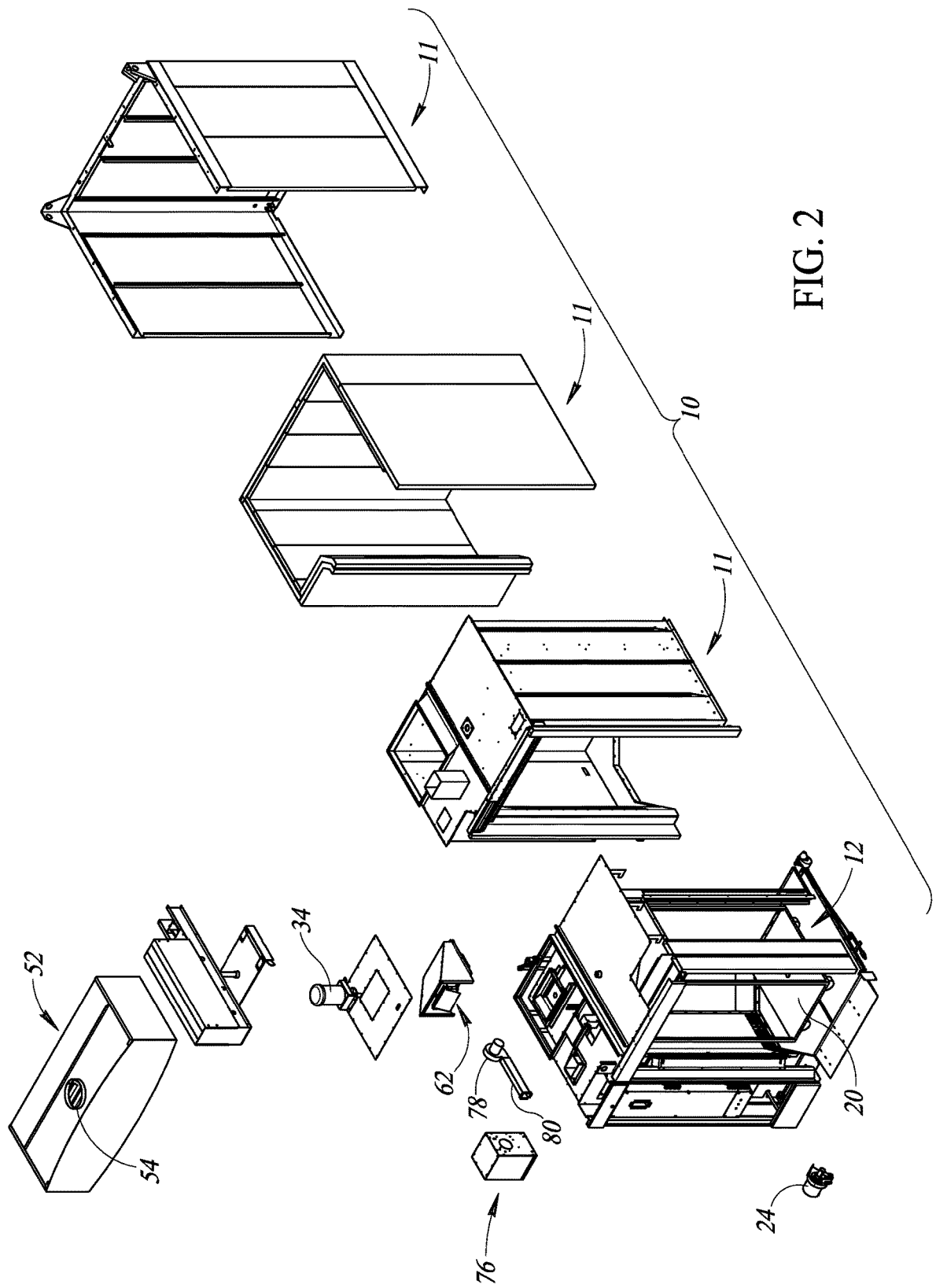
FIG. 2 is a partially exploded view of the cooking or baking oven of FIG. 1.
Figure 3:
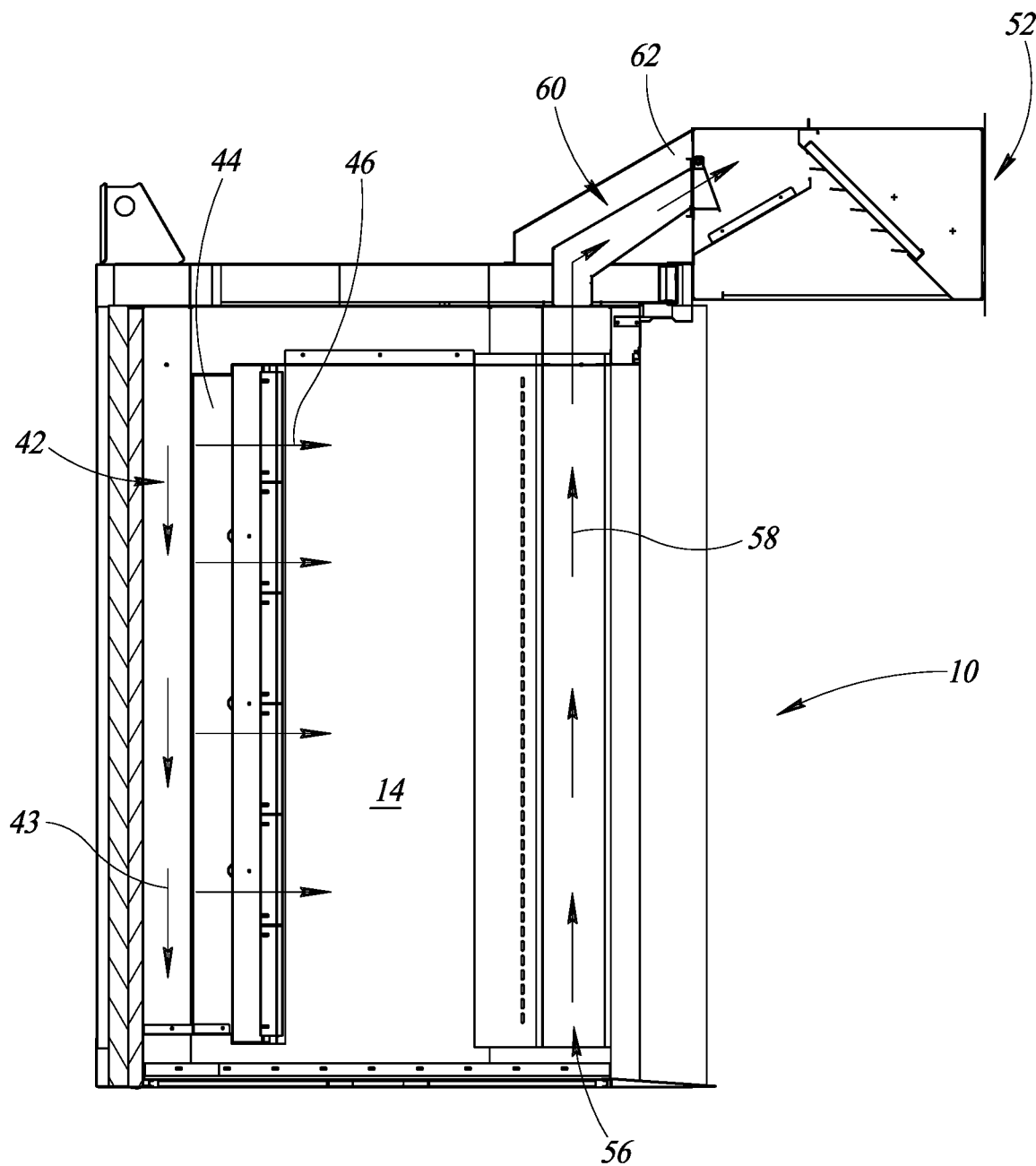
FIG. 3 is a cross-sectional view of the cooking or baking oven of FIG. 1, taken along lines 3-3.
Figure 4:
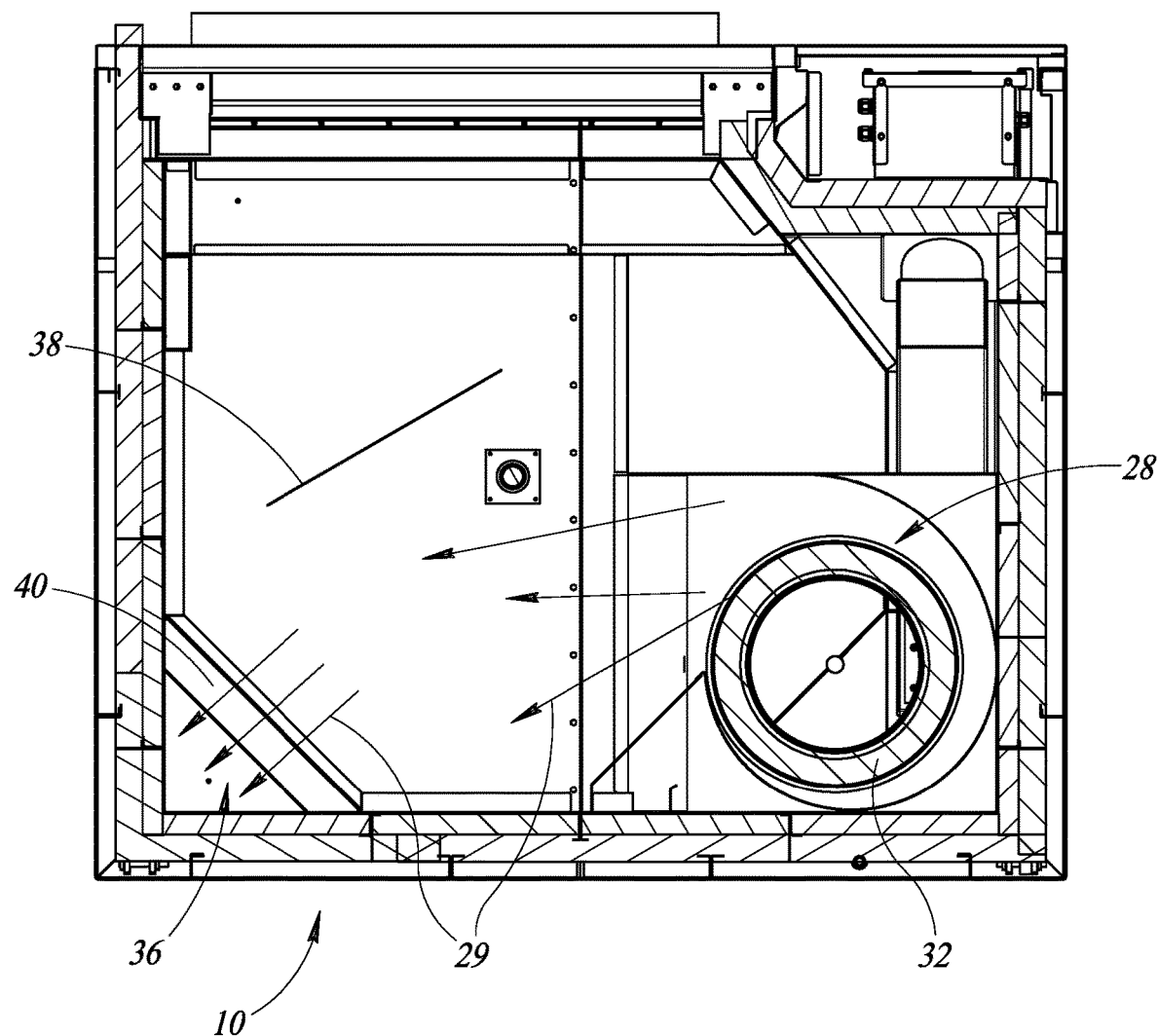
FIG. 4 is a cross-sectional view of the cooking or baking oven of FIG. 1, taken along lines 4-4.
Figure 5:
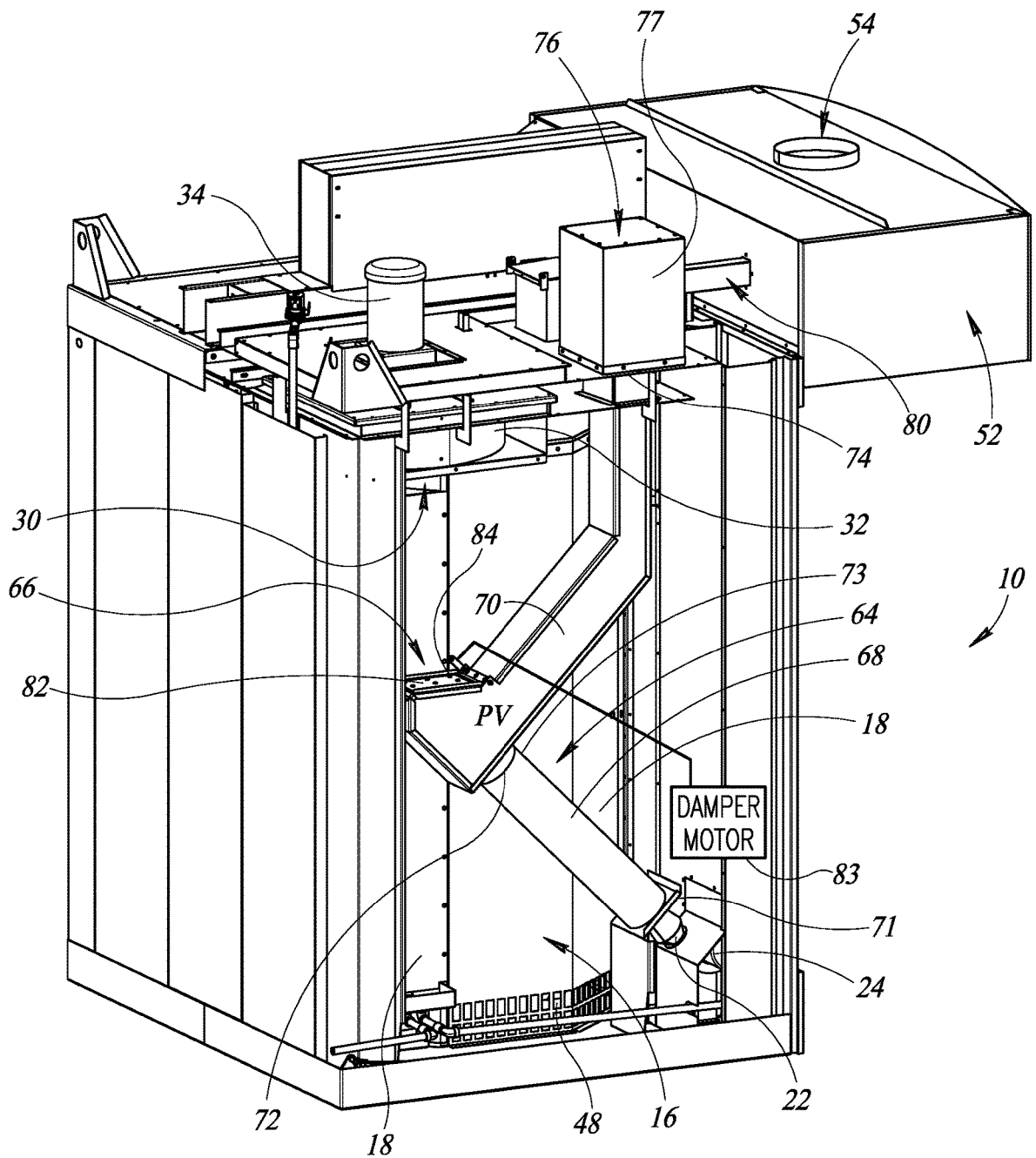
FIG. 5 is a perspective view of the cooking or baking oven of FIG. 1 with certain components removed for clarity of illustration.
Figure 6:
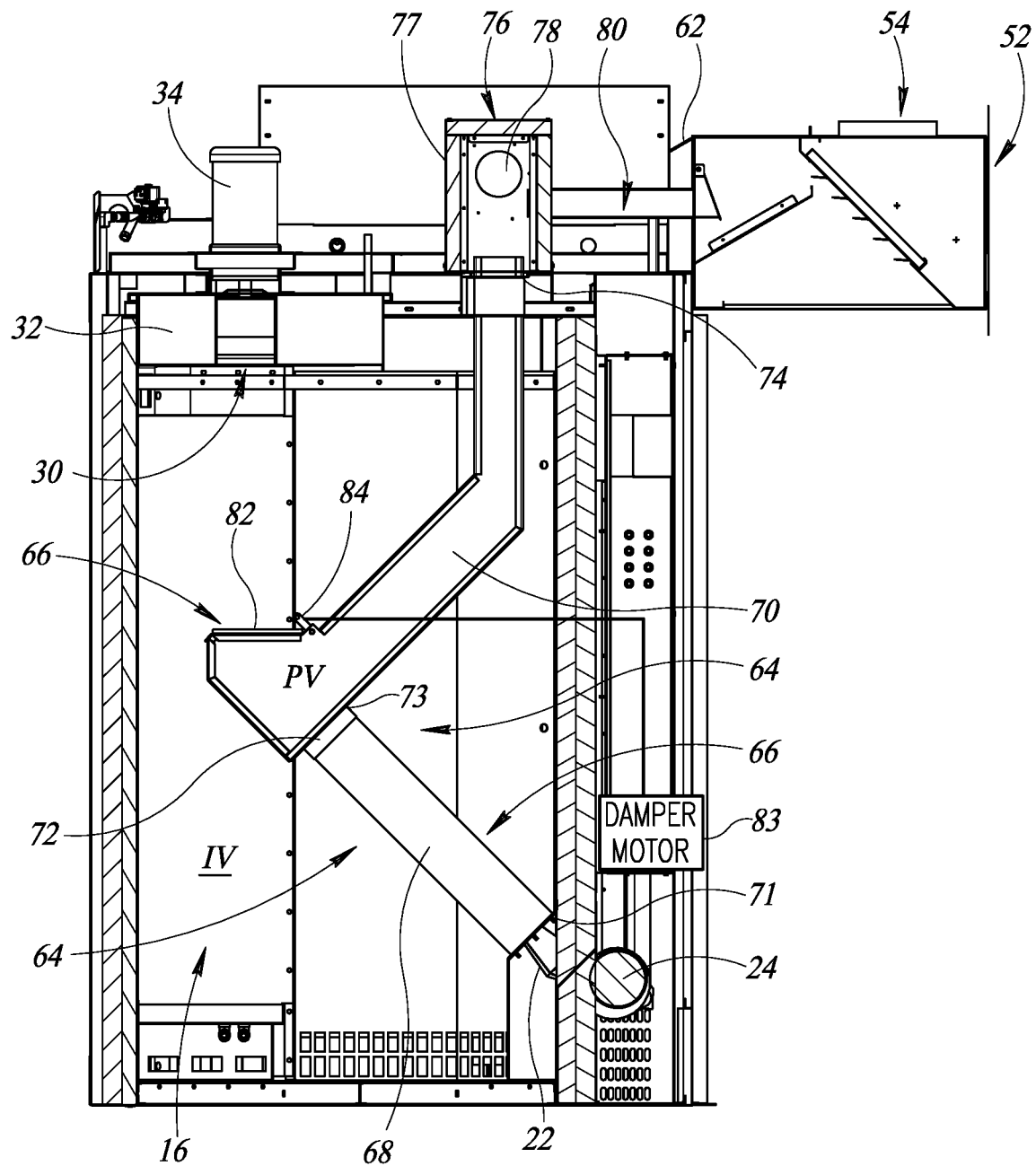
FIG. 6 is a cross-sectional view of the cooking or baking oven of FIG. 1, taken along lines 6-6.

In the following description, certain specific details are set forth in order to provide a thorough understanding of various disclosed implementations. One skilled in the relevant art will recognize that implementations may be practiced without one or more of these specific details. In other instances, well-known structures and devices associated with cooking or baking ovens and related apparatuses, systems, and methods may not be shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIGS. 1 through 7 illustrate a cooking or baking oven 10, according to one example implementation. The cooking or baking oven 10 is generally constructed via a plurality of panel assemblies 11 that surround or enclose the cooking or baking oven 10 and provide a door opening 12 to coupleably receive a door (not shown). In some implementations, the door can be rotatably coupled to the panel assemblies 11 in a known manner to allow the door to be opened and closed to place and remove food items in the cooking or baking oven 10. The panel assemblies 11 can include pressure panels, insulation panels, e.g., insulation panels comprising various high temperature insulating materials, such as fiberglass; solid panels; perforated panels; etc.

The cooking or baking oven 10 includes a cooking chamber 16 and a heating chamber 14. The cooking chamber 16 is isolated from the heating chamber 14 via one or more panel assemblies, for example, one or more pressure panels 18, which can be part of the panel assembly. The cooking chamber 16 can include a roll-in rack 20 positioned therein. The rack 20 can, in some implementations, be a rotatable rack 20. The rack 20 can also include, in some implementations, one or more trays on which a food item can be placed for baking, steaming, broiling, or, more generally, cooking. The cooking or baking oven 10 is generally configured to circulate heated air from the heating chamber 14 to the cooking chamber 16 and around the rack 20 to heat or cook the food item disposed thereon. As is described in more detail below, the heated air is thereafter directed back to the heating chamber 14 and can continuously circulate in this manner during a cooking operation. More particularly, the cooking or baking oven 10 includes a fuel burner 22, e.g., a combustion burner, which is operable via a burner motor 24 and coupleable to a fuel source 26 and an outside air source 27 via one or more supply lines. The fuel burner 22 may include a pilot burner, flame sensor, fuel controls, and other components to operate the fuel burner 22. The fuel burner 22 when ignited combusts a mixture of fuel supplied from the fuel source 26 and air supplied from the outside air source 27 to generate heat in the heating chamber 14, which heat increases a temperature of air in the heating chamber 14 to generate heated air. In particular, the fuel burner 22, in contrast to indirect fire systems, does not direct the combustion gases generated from the combustion of the mixture of fuel and air to a heat exchanger. In this manner, the various implementations of the cooking or baking ovens 10 described herein advantageously omit or exclude heat exchangers, thereby improving efficiencies of the cooking or baking ovens and also reducing costs of operation, manufacture, etc.

The heated air in the heating chamber 14 is drawn into an upper chamber 28 of the cooking or baking oven 10 via a fan inlet 30 of a blower or fan (hereinafter "fan") 32. The fan 32 is coupled to a motor 34. The motor 34 operates the fan 32 to circulate the heated air drawn into the upper chamber 28 and directs at least a portion of the heated air to a pressure panel chamber 36, as indicated by arrows 29. In some implementations, the upper chamber 28 can include one or more airflow baffles 38 disposed therein, which airflow baffles 38 can facilitate directing the heated air toward the pressure panel chamber 36. The heated air is received in the pressure panel chamber 36 via a pressure panel 40. The pressure panel 40 includes a plurality of perforations through which the heated air travels to the pressure panel chamber 36. In particular, the pressure panel 40 is sized and shaped to facilitate equalizing pressures in the cooking or baking oven 10 from a top portion thereof to a lower portion thereof.

As the heated air is circulated during operation of the cooking or baking oven 10, the heated air flows in the pressure panel chamber 36 and into an inlet chamber 42 as indicated by arrows 43. The heated air thereafter flows through one or more heating chamber pressure panel(s) 44 and into the cooking chamber 16, as indicated by arrows 46. As discussed above, the heated air circulates in the cooking chamber 16 and around the food item disposed on the rack 20 and can thereafter be directed back into the heating chamber 14 via a plurality of heating chamber inlets 48 disposed in the one or more pressure panels 18.

As shown in FIGS. 1-6, the cooking or baking oven 10 includes a hood 52 with an exhaust vent 54 through which the heated air can be exhausted from the cooking chamber 16 or the heating chamber 14. In particular, the cooking chamber 16 includes an outlet chamber 56 which provides an exhaust flow path to the hood 52, as indicated by arrows 58. The outlet chamber 56 extends to a vent outlet chamber 60 disposed in a vent member 62 coupled to the hood 52. In this manner, during an exhaustion phase, the heated air in the form of exhaust flows through the outlet chamber 56 to the vent outlet chamber 60 and thereafter through the exhaust vent 54 of the hood 52 into the environment or ducting.

The cooking or baking oven 10 includes a purge system 64 that limits or controls the purge volume of the combustion gases. In contrast to conventional cooking or baking ovens, such as direct fire ovens, where the fuel burners are not positioned in a controlled environment, thus leading to a large volume in the heating chamber and/or the cooking chamber which has to be purged, the implementations of the cooking or baking ovens 10 disclosed herein limit or restrict the purge volume. For example, as shown in FIGS. 1-6, the purge system 64 includes a burner tube 68, a flue 70, and a damping system 66. One end 71 of the burner tube 68 is coupled with the fuel burner 22 and another, opposing end 72 of the burner tube 68 is coupled to an inlet end 73 of the flue 70. The flue 70 includes an outlet end 74 which is coupled to a draft inducer apparatus 76. The draft inducing apparatus 76 can include a draft inducer housing 77 and a draft inducing blower 78, which can be operable by a motor. The draft inducing apparatus 76 is generally configured to induce a draft within the flue 70 and then impel the combustion gases drawn from the fuel burner 22 through the draft inducing blower 78. The draft inducing apparatus 76 is coupled to a draft inducer chamber 80 which extends to and is coupled to the hood 52. In this manner, under certain conditions discussed in more detail below, unused combustion gases can be impelled by the draft inducing blower 78 into the draft inducer chamber 80 and then into the hood 52, and thereafter exhausted through the exhaust vent 54 into the environment or ducting.

With continued reference to FIGS. 1 through 6, the damping system 66 includes a damper lid 82 and a damper arm 84 coupled to the damper lid 82. The damper arm 84 is operably coupled to a damper motor 83. More particularly, the damping system 66 includes a purge configuration and an operation configuration. The damper motor 83 is configured to rotate the damper arm 84, which rotatably moves the damper lid 82 to a closed position when the damping system 66 is in the purge configuration and an open position when the damping system 66 is in the operation configuration. When the damping system 66 is in the purge configuration, the closed position of the damper lid 82 defines a purge volume PV, which includes interior volumes of the burner tube 68 and the flue 70. The burner tube 68 and the flue 70 are sized and shaped such that the purge volume PV is less than an interior volume IV of the cooking or baking oven 10, i.e., the interior volume of the heating chamber 14 and the cooking chamber 16. In this manner, the purge volume PV reduces the overall volume of potential unburned combustion gases that have to be purged during a purging operation.

When the damper lid 82 is in the operation configuration, the damper motor 83 is configured to rotate the damper arm 84 to move the damper lid 82 to the open position which allows the combustion gases to flow from the fuel burner 22 to the heating chamber 14. As discussed above, the flow of the combustion gases to the heating chamber 14 heats the air, which heated air is directed to the cooking chamber 16 to facilitate cooking or baking of the food items in the rack 20.

Figure 7:
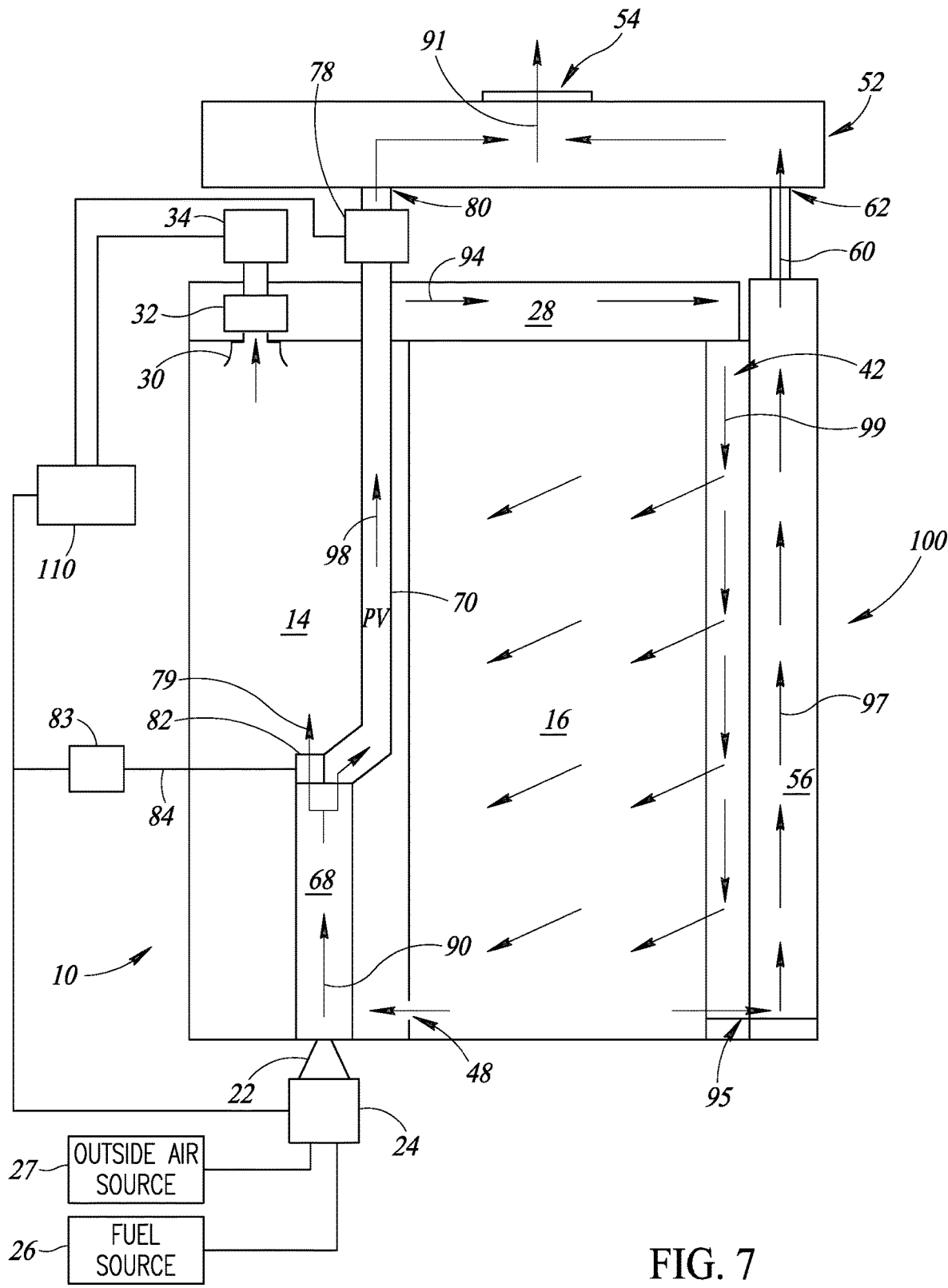
FIG. 7 is a schematic illustration of a cooking or baking oven management system, according to one example implementation.

FIG. 7 schematically illustrates a cooking management system 100, according to one example implementation, which can operate the various implementations of the cooking or baking ovens described herein. The cooking management system 100 includes a controller 110 which is operably and communicably coupled to the damper motor 83, the fuel burner blower 24, the draft inducer blower 78, and the motor 34, among other components of the cooking or baking oven 10, such as, for example, turners, lifts, and steam systems, etc. The controller 110 is configured to operate the fuel burner blower 24, the damper motor 83, the motor 34, and the draft inducer blower 78 during various operational stages of the cooking or baking oven 10.

During a purge cycle, the controller 110 can communicate with the damper motor 83 to rotatably move the damper arm 84 so that the damper lid 82 is in the closed position, if the damper lid 82 was in the open position. Once the damper lid 82 is in closed position, the controller 110 can operate the draft inducer blower 78 to purge or draw potential unburned gases in the purge volume PV, defined by the interiors of the burner tube 68 and the flue 70, into the hood 52 along flow paths 90, 98. The potential unburned gases can thereafter be exhausted through the vent outlet 54 along flow path 91 to the environment or ducting. In some implementations, the controller 110 can also be communicably coupled to one or more sensors disposed in or proximate to the burner tube 68, the flue 70, or more generally in or near the space defined by the purge volume PV to detect airflow along flow paths 90, 98 to ensure potential unburned gases have been fully purged. If desired, the purge cycle can be repeated multiple times until all the potential unburned gases have been purged. In other implementations, the cooking management system 100 can be configured to detect if the potential unburned gases have been fully purged from the purge volume PV by using multiple air changes along airflow paths 90, 98. For instance, the controller 110 can be configured to operate the damper motor 83 and the draft inducer blower 78 and the fuel burner blower 24 to exchange or replace air with, for example, ambient air, in the purge volume PV multiple times to ensure that the potential unburned gases have been fully purged to complete the purge cycle.

After the purge cycle is completed, the controller 110, in some implementations, can deactivate or shut down the draft inducer blower 78. In other implementations, however, the draft inducer blower 78 can remain operable to circulate heated air. More particularly, upon completion of the purge cycle, the controller 110 activates the damper motor 83 to rotatably move the damper arm 84, which movement moves the damper lid 82 to the open position. The controller 110 can thereafter activate the fuel burner blower 24 to draw in fuel from the fuel source 26 and air from the outside air source 27, which is mixed in the fuel burner 22, and ignited near or at a connection of the fuel burner 22 and the burner tube 68. As the fuel burner 22 is ignited, combustion gases flow along flow path 79 through the burner tube 68 and into the heating chamber 14 to heat the air.

The controller 110 also activates the motor 34 to drive the fan 32 to draw the heated air into the upper chamber 28 along flow path 94. The heated air flow circulates in the upper chamber 28 and into the cooking chamber 16 via a pressure panel chamber, as indicated by arrow 99. The heated air circulates in the cooking chamber 16 and can be directed back to the heating chamber 14 via one or more inlets, for example, heating chamber inlets 48. The heated air can continue to circulate in this manner and pick up more heat from the combustion gases. As shown in FIG. 7, the heated air can be directed to the outlet chamber 56 via one or more outlet chamber inlets 95. The one or more outlet chamber inlets 95 can, in some implementations, be in the form of perforations in pressure panels as discussed above. Thereafter the heated air can be exhausted or directed to the vent chamber 60 and through vent member 62, and to the hood 52 as indicated by arrow 97. The exhaust air can vent or exhaust to the environment or ducting along flow path 91.

The controller 110 is also configured to monitor and maintain the internal temperature of the cooking or baking oven 10 within a threshold temperature. The threshold temperature can be defined by minimum and maximum desirable operation temperatures of the cooking or baking oven 10. In some implementations, the cooking or baking oven 10 can include one or more sensors, gauges, etc., to determine the internal temperature of the cooking or baking oven 10. The one or more sensors are communicably coupled to the controller 110 and can communicate the internal temperature to the controller 110. The controller 110 in some implementations continuously receives output signals from the one or more sensors indicating the internal temperature of the cooking or baking oven 10. In other implementations, the controller 110 periodically receives output signals from the one or more sensors indicating the internal temperature of the cooking or baking oven 10. The controller 110 is configured to process the output signals indicating the internal temperature of the cooking or baking oven 110 and compare the internal temperature with the defined threshold temperature. The controller 110 can adjust the internal temperature of the cooking or baking oven 10 if the internal temperature is below or above the defined threshold temperature. For example, the controller 110 is operably coupled to the fuel burner blower 24. The controller 110 can adjust the speed of the fuel burner blower 24 to increase or decrease the flow of the combustion gases to adjust the internal temperature of the cooking or baking oven 10. In this manner, the cooking management system 100 can avoid switching the fuel burner 22 and/or the fuel burner motor 24 between on and off positions to maintain the internal temperatures within a defined threshold range.

Further, any of the components of the cooking management systems described herein can be controlled by one or more computer systems, either directly or through the controller 110, as described above. Similarly, any of the measurements and data referred to herein can be collected, stored, and analyzed by the computer system(s). A computer system may generally include, without limitation, one or more computing devices, such as processors, microprocessors, programmable logic controllers, control boards, digital signal processors (DSP), application-specific integrated circuits (ASIC), and the like. To store information, a computer system may also include one or more storage devices, such as volatile memory, non-volatile memory, read-only memory (ROM), random access memory (RAM), and the like. The storage devices can be coupled to the computing devices by one or more buses. A computer system may further include one or more input devices (e.g., displays, keyboards, touchpads, controller modules, or any other peripheral devices for user input) and output devices (e.g., displays screens, light indicators, and the like). A computer system can store one or more programs for processing any number of different workpieces according to designated paths.

A computer system may include multiple interacting computing systems or devices, and the computer system may be connected to other devices, including through one or more networks, such as the Internet. More generally, a computing device or other computing system may comprise any combination of hardware or software that may interact and perform the described types of functionality, including without limitation, desktop or other computers, database servers, network storage devices and other network devices. In addition, the functionality provided by the computer system may, in some implementations, be distributed in various software modules. Similarly, in some implementations some of the functionality of the computer system may not be provided and/or other additional functionality may be available.

Software running on the computer system can be stored in memory while being used, or can be transferred between memory and other storage devices for purposes of memory management and data integrity. Alternatively, in other implementations some or all of the software modules and/or systems may execute in memory on another device and communicate with the computer system via inter-computer communication. Furthermore, in some implementations, some or all of the systems and/or modules may be implemented or provided in other manners, such as at least partially in firmware and/or hardware. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other implementations. Accordingly, implementations of the present invention may be practiced with other computer system configurations.

Moreover, the various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A cooking or baking oven, comprising:
a hood having a vent outlet;
a cooking chamber;
a rack positioned in the cooking chamber;
a heating chamber separated from the cooking chamber;
a fuel burner;
a fuel burner blower operably coupled to the fuel burner;
a burner tube including an interior volume and having an inlet end and an outlet end, the inlet end coupled to the fuel burner;
a flue including an interior volume and having an inlet end coupled to the outlet end of the burner tube and an outlet end coupled to the hood, the flue having an opening; and
a damping system including:
a damper lid coupled to the flue, the damper lid moveable between an open position and a closed position, the damper lid in the closed position covering the opening;
a damper motor; and
a damper arm coupled to the damper lid and the damper motor, the damper motor rotatably moving the damper arm to move the damper lid between the open and closed positions, wherein the interior volume of the burner tube and the interior volume of the flue defines a purge volume when the damper lid is in the closed position, the purge volume being less than an internal volume of the heating chamber and the cooking chamber.

2. The cooking or baking oven of claim 1 wherein, the damper lid in the closed position defines a purge flow path of potential unburned combustion gases in the purge volume to the vent outlet of the hood.

3. The cooking or baking oven of claim 2, further comprising:
a draft inducing apparatus having a draft inducing blower, the draft inducing blower drawing the potential unburned combustion gases along the purge flow path to the vent outlet of the hood.

4. The cooking or baking oven of claim 1 wherein, the damper lid in the open position, defines a combustion gas flow path of a combustion gas flowing from the burner to the interior volume of the heating chamber, the combustion gas heating air in the interior volume of the heating chamber to generate heated air.

5. The cooking or baking oven of claim 4, further comprising:
a fan configured to draw heated air into an upper chamber, the heated air flowing from the upper chamber to the cooking chamber.

6. The oven of claim 5 wherein the cooking chamber includes one or more inlets to circulate the heated air from the cooking chamber into the heating chamber.

7. A cooking management system comprising:
a cooking or baking oven including a cooking chamber and a heating chamber, the cooking chamber and the heating chamber having an internal cooking or baking oven volume, the cooking or baking oven including:
a fuel burner which provides combustion gases;
a fuel burner blower operably coupled to the fuel burner;
a hood having a vent outlet, the hood coupled to the fuel burner via an enclosure which defines an interior volume of combustion gases, the interior volume being less than the internal cooking or baking oven volume; and
a damping system including:
a damper lid coupled to the enclosure;
a damper arm coupled to the damper lid; and
a damper motor operably coupled to the damper lid, the damper motor moving the damper lid between an open position and a closed position; and
a controller operably coupled to the damper motor, the controller causing the damper motor to move the damper lid between the open and closed positions.

8. The cooking management system of claim 7 wherein the controller, during a purge operation and when the fuel burner is in a non-use configuration, causes the damper motor to move the damper lid to the closed position to exhaust potential unburned combustion gases in the interior volume of the enclosure through the vent outlet of the hood.

9. The cooking management system of claim 7 wherein the controller, when the fuel burner is in a use configuration, causes the damper motor to move the damper lid to the open position to provide a flow path for the combustion gases to move to the heating chamber of the cooking or baking oven, the combustion gases heating air in the heating chamber to generate heated air.

10. The cooking management system of claim 9 wherein the cooking or baking oven further comprises:
a fan operably coupled to the controller, the controller operating the fan to circulate air from the heating chamber to the cooking chamber.

11. The cooking management system of claim 7 wherein the controller is configured to maintain an internal temperature of the cooking or baking oven within a threshold range.

12. The cooking management system of claim 11 wherein the controller is operably coupled to the fuel burner blower, the controller, in response to the internal temperature of the cooking or baking oven being outside the threshold range, adjusting a speed of the fuel burner blower to maintain the internal temperature of the cooking or baking oven within the threshold range.

13. The cooking management system of claim 11, further comprising:
one or more sensors disposed in the cooking or baking oven to determine the internal temperature of the cooking or baking oven.

14. The cooking management system of claim 13 wherein the one or more sensors are communicably coupled to the controller to communicate the internal temperature of the cooking or baking oven.

15. The cooking management system of claim 7 wherein the cooking or baking oven further comprises:
a draft inducing apparatus having a draft inducing blower, the controller operably coupled to the draft inducing blower, the controller operating the draft inducing blower to draw potential unburned combustion gases to the vent outlet of the hood when the damper arm is in the closed position.

16. A cooking management system comprising:
a cooking or baking oven including a cooking chamber and a heating chamber, the cooking chamber and the heating chamber having an internal cooking or baking oven volume, the cooking or baking oven including:
a fuel burner which provides combustion gases;
a fuel burner blower operably coupled to the fuel burner;
a hood having a vent outlet, the hood coupled to the fuel burner via an enclosure which defines an interior volume of combustion gases; and
a damping system including:
a damper lid coupled to the enclosure;
a damper arm coupled to the damper lid; and
a damper motor operably coupled to the damper lid, the damper motor moving the damper lid between an open position and a closed position; and
a controller operably coupled to the damper motor, the controller causing the damper motor to move the damper lid between the open and closed positions, wherein the controller, during a purge operation and when the fuel burner is in a non-use configuration, causes the damper motor to move the damper lid to the closed position to exhaust potential unburned combustion gases in the interior volume of the enclosure through the vent outlet of the hood.

17. A cooking management system comprising:
a cooking or baking oven including a cooking chamber and a heating chamber, the cooking chamber and the heating chamber having an internal cooking or baking oven volume, the cooking or baking oven including:
a fuel burner which provides combustion gases;
a fuel burner blower operably coupled to the fuel burner;
a hood having a vent outlet, the hood coupled to the fuel burner via an enclosure which defines an interior volume of combustion gases; and
a damping system including:
a damper lid coupled to the enclosure;
a damper arm coupled to the damper lid; and
a damper motor operably coupled to the damper lid, the damper motor moving the damper lid between an open position and a closed position; and
a controller operably coupled to the damper motor, the controller causing the damper motor to move the damper lid between the open and closed positions, wherein the controller, when the fuel burner is in a use configuration, causes the damper motor to move the damper lid to the open position to provide a flow path for the combustion gases to move to the heating chamber of the cooking or baking oven, the combustion gases heating air in the heating chamber to generate heated air.

18. A cooking management system comprising:
a cooking or baking oven including a cooking chamber and a heating chamber, the cooking chamber and the heating chamber having an internal cooking or baking oven volume, the cooking or baking oven including:
a fuel burner which provides combustion gases;
a fuel burner blower operably coupled to the fuel burner;
a hood having a vent outlet, the hood coupled to the fuel burner via an enclosure which defines an interior volume of combustion gases; and
a damping system including:
a damper lid coupled to the enclosure;
a damper arm coupled to the damper lid; and
a damper motor operably coupled to the damper lid, the damper motor moving the damper lid between an open position and a closed position; and a controller operably coupled to the damper motor, the controller causing the damper motor to move the damper lid between the open and closed positions, wherein the controller is configured to maintain an internal temperature of the cooking or baking oven within a threshold range.

19. A cooking management system comprising:

a cooking or baking oven including a cooking chamber and a heating chamber, the cooking chamber and the heating chamber having an internal cooking or baking oven volume, the cooking or baking oven including:
   a fuel burner which provides combustion gases;
   a fuel burner blower operably coupled to the fuel burner;
   a hood having a vent outlet, the hood coupled to the fuel burner via an enclosure which defines an interior volume of combustion gases; and
   a damping system including:
      a damper lid coupled to the enclosure;
      a damper arm coupled to the damper lid; and
      a damper motor operably coupled to the damper lid, the damper motor moving the damper lid between an open position and a closed position;
a controller operably coupled to the damper motor, the controller causing the damper motor to move the damper lid between the open and closed positions; and
a draft inducing apparatus having a draft inducing blower, the controller operably coupled to the draft inducing blower, the controller operating the draft inducing blower to draw potential unburned combustion gases to the vent outlet of the hood when the damper arm is in the closed position.

* * * * *